United States Patent Office 3,516,053
Patented June 2, 1970

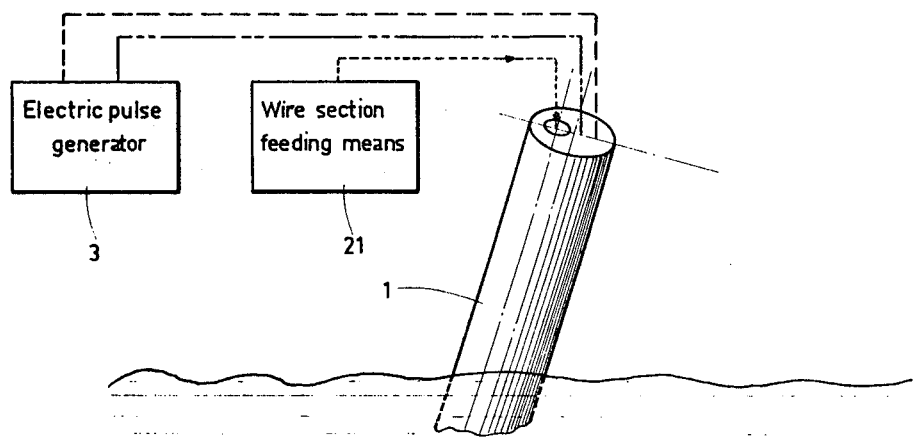
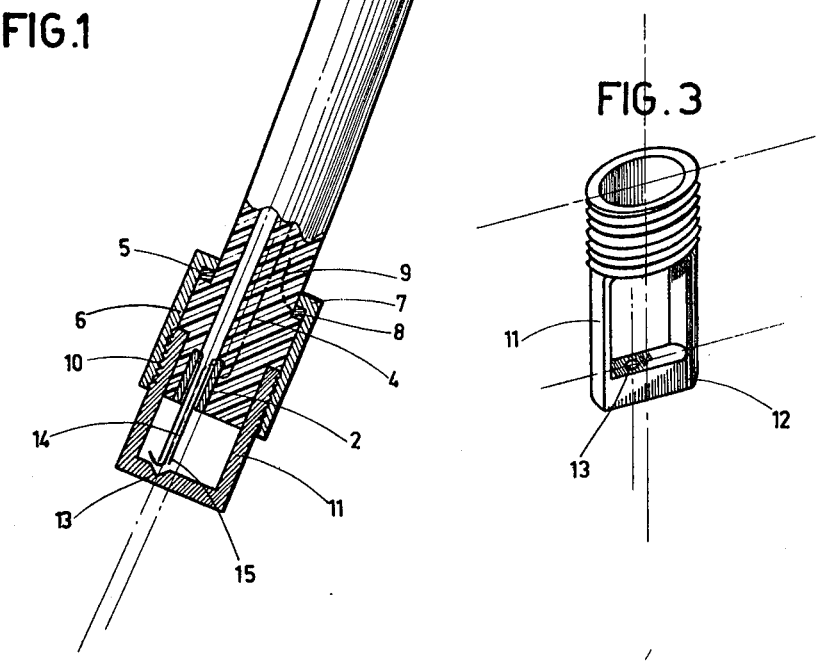
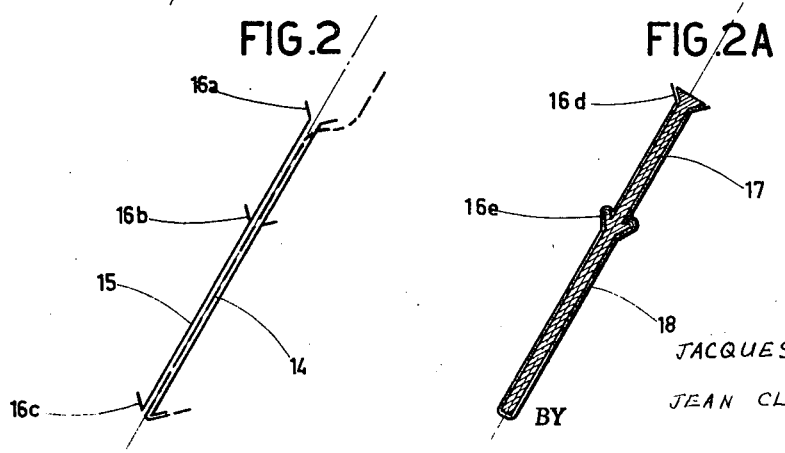

3,516,053
SPARK GENERATOR
Jacques Cholet, Rueil-Malmaison, and Jean Claude Dubois, Royan, France, assignors to Institut Francois du Petrole des Carburants et Lubrifiants, Rueil-Malmaison, Hauts-de-Seine, France
Filed July 3, 1967, Ser. No. 650,677
Claims priority, application France, July 6, 1966, 68,499
Int. Cl. G01v 1/28
U.S. Cl. 340—12          7 Claims

ABSTRACT OF THE DISCLOSURE

A spark generator is described for use in underwater seismic prospecting. The spark generator comprises one pair of electrodes insulated from each other and respectively connected to the two terminals of a high energy source of electric current. A metallic exploding wire section having two ends which are respectively in contact with the ends of the pair of electrodes is also provided. A first electrode of the pair is secured substantially at the immersed end of a tube of insulating material dipping into the water, and the second electrode of the pair, also fixed at the immersed end of the tube, comprises an element which is external to the tube and forms in abutment in alignment with the inner passage of the tube at its immersed end. The tube is provided at its unimmersed end with exploding wire sections associated with means for stiffening the wire section along the length thereof substantially equal to the distance between the two electrodes of the pair. The stiffening means is destructible upon explosion, and means are provided for conveying the wire sections from the unimmersed end to the immersed end of the tube.

---

A known method for underwater seismic prospecting consists in emitting sound energy by means of sparks produced by an immersed spark generator.

One type of spark generator which can be used for this purpose comprises essentially two electrodes connected by a wire of a metal which is a good conductor of electricity. As a result of a sudden discharge of electric current through the electrodes, the metallic wire explodes, liberating a high energy.

When it is wanted to carry out series of such explosions at short time intervals, a few seconds for example, the difculty arises of providing for a fast replacement of the exploding wire.

This problem has not been solved until now and there is no spark generator of this type available which could be used for the emission of sound waves at short intervals. The object of the present invention is to meet these difficulties by the provision of a spark generator which is so designed as to permit to rapidly and substantially continuously replace the exploding wire.

The spark generator according to the invention supplied with high intensity electric current by a generator comprises at least one pair of electrodes between which is connected an exploding metallic wire of small diameter which explodes when it is fed with electric current, a first electrode of said pair connected to the generator being substantially located at the level of the immersed end of a tube of insulating material dipping into the water and the other electrode which externally forms an abutment being fastened to the immersed end of the tube. This second electrode comprises an element located outside said tube forming an abutment in alignment with the internal passage of said tube at the immersed end thereof, said tube being provided at its unimmersed end with means for sequentially feeding said immersed end with exploding wires associated with means for stiffening said wires on a length thereof which is substantially equal to the distance between the two electrodes of said pair, these stiffening means being destructible through explosion and means for conveying said wires from the unimmersed end to the immersed end of said tube.

Such a spark generator will be described more in detail with reference to the annexed drawings in which:

FIG. 1 illustrates in partial longitudinal section a spark generator according to the invention;

FIG. 2 shows a longitudinal sectional view of an exploding wire in its coating according to the invention, FIG. 2a illustrates a longitudinal sectional view of an exploding wire provided with an inner support, FIG. 3 is an overall view of an electrode of the spark generator according to the invention.

One of the possible embodiments of the spark generator according to the invention is shown on FIG. 1, by way of non limitative example. It comprises essentially a tube 1 of insulating, preferably flexible material, one end of which is connected to a mobile installation (not shown) such as, for example, a ship, and the other of which is immersed. A first ring-shaped metallic electrode 2 is inserted in the inner wall of the immersed end of the tube 1. This first electrode is electrically connected to a spark generator 3, located on the ship, through a metallic conductor 4 which may be embedded in the insulating material of tube 1. A conducting ring 5 is placed on the external wall of tube 1 and secured thereto by means of a metallic sleeve 6 comprising at one of its ends a circular flange 7 which presses the ring 5 against a shoulder 8 on the external wall of the tube 1. The ring 5 is connected to the spark generator 3 through an electric conductor 9, which is for example embedded in the insulating material of the tube 1.

At its other end, the sleeve 6 is provided with an inner threading 10 for screwing on the end of a second metallic electrode 11. This electrode 11 having the shape of a sleeve whose lateral wall is cut away, as shown by FIG. 3, fits on the end of the tube 1 of insulating material, when screwed on the sleeve 6. The unthreaded end of the electrode 11 has a base 12 wherein a cavity 13 is provided which does not run completely through this base.

The external wall of the sleeve 6, its circular flange 7 as well as the external and internal walls of the electrode 11, except the wall of the cavity 13, will advantageously be covered with a coating of insulating material.

A metallic exploding wire 14 of very small diameter, comprised, for example, between $5/100$ and $10/100$ mm., is located between the two electrodes so that one of its ends is in contact with the ring 2, while the other end is placed in the cavity 13.

When the spark generator 3 (comprising for example a group of capacitors which are suddenly and simultaneously discharged) is in operation, the high intensity current which suddenly flows through the electrodes 2 and 11 and therefore through the wire 14, causes the explosion of the latter, thereby generating a high sound energy.

When it is wished to realize series of shots composed of a plurality of such explosions at short time intervals from each other; it is necessary to rapidly replace the wire 14.

According to the invention each wire 14 is placed before each shooting operation, into a coating 15 of substantially rigid material, such as glass or brittle plastic material, this coating being slightly shorter than the wire 14. the coating 15 may be provided at different levels with circular lips 16a, 16b, 16c, of elastic material. The lower end of the wire 14 projects out of the casing 15 just under the lip 16a, so as to be pressed against the electrode 2 through the pressure from this lip when the wire 14 is in its position for explosion.

The end of the wire located in the cavity 13 is folded so as to provide a better electric contact.

Another arrangement of the explosion wire is shown on FIG. 2a. It comprises essentially a rod 17, of elastic material, destructible by explosion, on which a thin metallic layer 18 is deposited. The rod 17 may be provided with two lips 16d, 16e, at each end, the lower surface of which is also covered by a thin metalic layer. Their elasticity provides a good electric contact with electrode 2.

They also provide an additional surface in contact with the flow of water under pressure for properly conveying the wire along the tube.

The coatings 15 containing their wires, or the metallized rods, are sent at the desired rate, for example by means (shown at 21) of a drum which distributes them automatically into the tube 1 wherein they are made to slide by a flow of water or air under pressure, until they come in position, one end being in abutment in the cavity 13, and the other end in contact with the ring 2.

The distribution of the exploding wires into the tube 1 by means of the drum distributor may be effected, for example, in the manner described in French Pat. No. 1,422,837.

We claim:

1. Spark generator for underwater seismic prospecting comprising at least one pair of electrodes insulated from each other and respectively connected to the two termininals of a source of high intensity electric current and a metallic exploding wire section having two ends which are respectively in contact with the ends of said pair, wherein a first electrode of said pair is secured substantially at the immersed end of a tube of insulating material dipping into the water, the second electrode of said pair, fixed at said immersed end of the tube comprises an element which is external to said tube and forms an abutment in alignment with the inner passage of said tube at the immersed end thereof, and said tube is provided at its unimmersed end with exploding wire sections associated with means for stiffening said wire sections on a length thereof substantially equal to the distance between the two electrodes of said pair, this stiffening means being destructible by explosion, and means for conveying said wire sections from the unimmersed end to the immersed end of said tube.

2. Spark generator for seismic prospecting according to claim 1, wherein the first electrode is constituted by a conducting ring secured to the inner wall of the tube at the immersed end thereof.

3. Spark generator according to claim 1, wherein the second electrode has the shape of a sleeve whose lateral wall is cut away, comprising at one end an external threading and at the other end a base wherein a cavity is provided on a part of its length, this electrode being fixed at the immersed end of said tube by means of a metallic tube one end of which comprises an internal threading adapted for screwing on said external threading of the second electrode and the other end of which is provided with a flange bearing on an external shoulder of the tube.

4. Spark generator according to claim 3 wherein the second electrode is supplied with electric current by means of a metallic ring located on the external shoulder formed on the outer wall of the tube and disposed between the flange formed on the end of the metallic tube and the external shoulder of said tube, this ring being connected to said source of electric current through an electric conductor.

5. Spark generator according to claim 1, wherein the means for stiffening the exploding wire comprises a coating of destructible substantially rigid material, which covers the wire on a length thereof which is slightly shorter than that of said wire.

6. Spark generator according to claim 1, wherein the means for stiffening the exploding wire comprises a longitudinal rod housed inside said wire.

7. Spark generator according to claim 1, wherein the means for stiffening the exploding wire is externally provided with elastic lips.

References Cited

UNITED STATES PATENTS

| 3,368,643 | 2/1968 | Berglund et al. |
| 3,369,217 | 2/1968 | Luehrmann et al. |

RODNEY D. BENNETT, Primary Examiner

B. L. RIBANDO, Assistant Examiner

U.S. Cl. X.R.

181—.5